United States Patent [19]
Ruetschle et al.

[11] Patent Number: 5,201,695
[45] Date of Patent: Apr. 13, 1993

[54] MACHINE TOOL

[75] Inventors: Eugen Ruetschle, Muehlheim; Hans-Henning Winkler, Tuttlingen, both of Fed. Rep. of Germany

[73] Assignee: Chiron-Werke GmbH & Co. KG, Tuttlingen, Fed. Rep. of Germany

[21] Appl. No.: 772,696

[22] Filed: Oct. 7, 1991

[30] Foreign Application Priority Data

Oct. 9, 1990 [DE] Fed. Rep. of Germany ....... 4031997

[51] Int. Cl.$^5$ .............................................. B23Q 3/157
[52] U.S. Cl. ................................................ 483/3; 483/47
[58] Field of Search ........................... 29/568; 211/1.5; 483/54, 52, 46, 62, 47, 39, 3, 57

[56] References Cited

U.S. PATENT DOCUMENTS

| | | | |
|---|---|---|---|
| 4,459,737 | 7/1984 | Möri et al. | 483/46 |
| 4,557,035 | 12/1985 | Rütschle et al. | 483/47 |
| 4,759,114 | 7/1988 | Babel | 211/1.5 |
| 4,887,345 | 12/1989 | Saito et al. | 483/39 |
| 4,930,208 | 6/1990 | Winkler et al. | 483/3 |

Primary Examiner—William Briggs
Attorney, Agent, or Firm—Pretty, Schroeder, Brueggemann & Clark

[57] ABSTRACT

A machine tool has a spindle rotating about a spindle axis and a quill that can be displaced relative to the spindle in the direction of the spindle axis. Arranged at intervals around the spindle are a number of gripper arms that are fastened to the quill, whereby each gripper arm carries a tool holder that has a cone. The cone of each tool holder can be individually engaged, by means of the gripper arm, from a magazine position located at a distance from the spindle into a working position located in the spindle, while the other tool holders are retained in the magazine position. In the magazine position, each of the tool holders is inserted into a separate sheath open at the bottom, which forms a cover at least for the respective cone. With the machine tool the sheaths are located on the gripper arms.

3 Claims, 4 Drawing Sheets

MACHINE TOOL

The invention relates to a machine tool with a spindle rotating about a spindle axis, with a quill that can be displaced relative to the spindle in the direction of the spindle axis, and with a number of gripper arms that are arranged at intervals around the spindle and are fastened to the quill, such that each gripper arm carries a tool holder which has a cone, and such that the cone of each tool holder can be individually engaged, by means of the gripper arm which carries it, from a magazine position at a distance from the spindle into a working position in the spindle, while the other tool holders are retained in the magazine position in which each one is inserted into a separate sheath open at the bottom, which forms a cover at least for the respective cone.

A machine tool of the aforesaid type is known from DE-A 38 29 105.

In the known machine tool, there is provided on the headstock a quill, which surrounds the spindle and can be moved relative to the longitudinal axis of the spindle. Fastened to the quill are a plurality of gripper arms, each of which ends at its lower end in a gripper which is occupied by a tool holder. The tool holders can be selectively engaged in a working position in the spindle using the gripper arms and by displacement of the quill.

The grippers are part of a parallelogram mechanism which ensures that when the tool holders are swung between the working position and a magazine position, they are held in alignment essentially with the vertical axis. In the magazine position the gripper arms are swung vertically upward so that the tool holders are located above the spindle nose in the vicinity of the quill, with the cones of the tool holders being inserted into cavities that are formed in a radial projection on the quill. The cavities act as sheaths for the tool holders and protect them from flying metal chips in the working area of the known machine tool. This ensures that during a machining procedure, no metal chips can land on the cones of the tool holders that will be used next and adhere to them because of the drilling fluid on them, which would lead to problems when changing and clamping the tool holder.

With the known machine tool there is also provided on each gripper arm a cover which, when the gripper arm swings into the working position, caps the cavity that has now been vacated by the tool holder. This prevents metal chips from getting into the cavity associated with the tool holder that is in the working position.

In the known machine tool the grippers are designed so that the tool holders are mounted rotatably therein, so that the respective gripper can remain on the tool holder even when the latter is in the working position. For this reason, the grippers have substantial radial dimensions.

A disadvantage of the known machine tool is that in the magazine position, the gripper must be located very close to the quill in order to be able to insert the cones of the tool holders into the cavities in the quill. Because of the dimensions of the grippers, which must not interfere with one another when swinging between the magazine position and the working position, the total number of gripper arms and therefore of tools that can be used is limited with the known machine tool. It is usually between 10 and 12.

With many workpieces, however, it is necessary to use more than 12 different tools during machining. With the known machine tool, such a workpiece must therefore be machined in two separate procedures on two differently equipped machine tools. This means not only higher capital costs for a second machine tool, but also that the overall machining time for such a workpiece is considerably longer because of the rechucking that is needed. Moreover, the dimensional accuracy of a workpiece machined on two different machine tools is not always satisfactory.

The object on which the invention is based is therefore that of developing a machine tool of the aforesaid type in such a way that the disadvantages mentioned above are eliminated. In particular, the intent is to make it possible, with a configuration that is easy to design and manufacture, to use a larger number of tools during a machining procedure.

According to the present invention, this object is achieved by the fact that the sheaths are located on the gripper arms.

The object on which the invention is based is thus completely achieved. Because, in the new machine tool, the sheaths are located on the gripper arms, the sheaths and therefore the grippers can be moved, in the magazine position, radially outward from the quill. In the magazine position the grippers then lie on a peripheral circle around the quill, which makes it possible to provide a larger number of grippers and therefore tool holders with tools on the new machine tool.

This is in itself surprising, since the gripper arms not only must still be located on the quill, but must also in fact still carry the sheaths. It has been found, however, that the features according to the present invention are not disadvantageous-as would have been expected-but on the contrary make it possible to provide a larger number of gripper arms on the quill.

In one practical example of the new machine tool, it is preferable if, while a tool holder is swinging between the magazine position and the working position, the associated sheath is aligned with its longitudinal axis essentially parallel to a longitudinal axis of the tool holder.

This feature is especially advantageous because the sheaths can be configured with such a precise fit to the tool holders that the latter do not experience major pivoting motions when inserted into or removed from the sheaths. Since the radial dimensions of the sheaths are therefore only slightly greater than those of the tool holders, this feature also makes it possible to increase the number of gripper arms.

It is also preferable if the longitudinal axis of the tool holder and the longitudinal axis of the sheath are essentially always aligned parallel to the spindle axis.

This feature advantageously ensures that the tool holders require little space on their path between the magazine position and the working position, so that adjacent tool holders can be placed even closer together without influencing one another. This therefore also makes it possible, advantageously, to increase the number of gripper arms on the new machine tool.

It is also preferable if the gripper arms are part of a parallelogram mechanism that has two rods parallel to one another, and if the sheath is mounted with a first pivot on the first beam and with a second pivot on the second beam, with an imaginary connecting line being aligned between the two pivots, essentially parallel to sides of the parallelogram mechanism which are different from the beams or rods.

This feature is advantageous especially in terms of design and manufacturing, since the alignment of the sheath with its axis parallel to the tool holder is ensured by the parallelogram mechanism. No additional features on the gripper arms that might increase their working radius are required. Since the sheath thus moves along with the gripper arms when it swings, it can be designed to fit even more tightly and therefore to be smaller. This complete departure from the known concept of locating the sheath immovably in the quill thus has the unforeseen result that the number of gripper arms and therefore the number of tools available during a machining procedure is increased with the machine tool according to the present invention, as compared with the known machine tool.

In this practical example it is especially preferred if the sheath is made of plastic and is fastened to the gripper arm by insertion of its pivots.

This feature first of all results in a weight saving, since the plastic sheaths are considerably lighter than the radial projection of the quill provided for in the prior art. In addition, this feature also offers manufacturing advantages, since injection molding or casting of plastic parts is considerably more economical than the metal processing required, in the prior art, in order to create the cavities in the quill. Because of the plug-in arrangement of the sheath, the new machine tool is also very easy to service, since after removal of the sheaths, the tool holders can be serviced and/or inspected even when in the magazine position.

When the sheaths are made of plastic and are therefore flexible, the requirements for its pivots in terms of parallelism with the sides of the parallelogram are not great. Any deviation from this parallelism does not cause the gripper arms to jam, but is compensated for by the flexible sheaths.

It is also preferable if a cover is provided on the gripper arm which automatically caps the sheath when the respective tool holder is in the working position.

This feature, known in the art, offers the advantage that the sheath which would otherwise be open when the tool holder is in the working position is capped and protected from flying chips, without features which would additionally increase the working radius of the gripper arms. Eliminating any increase in the working radius of the gripper arms means, as mentioned above, that a larger number thereof, specifically up to 20, can be arranged on the periphery of the quill.

Further advantages are evident from the description and the attached drawings.

It is understood that the features mentioned above and those yet to be explained below are usable not only in the particular combinations indicated, but also in other combinations or in isolation, without leaving the context of the present invention.

A practical example of the invention is illustrated in the drawings and will be explained in more detail in the description below. In the drawings.

Figure 1:
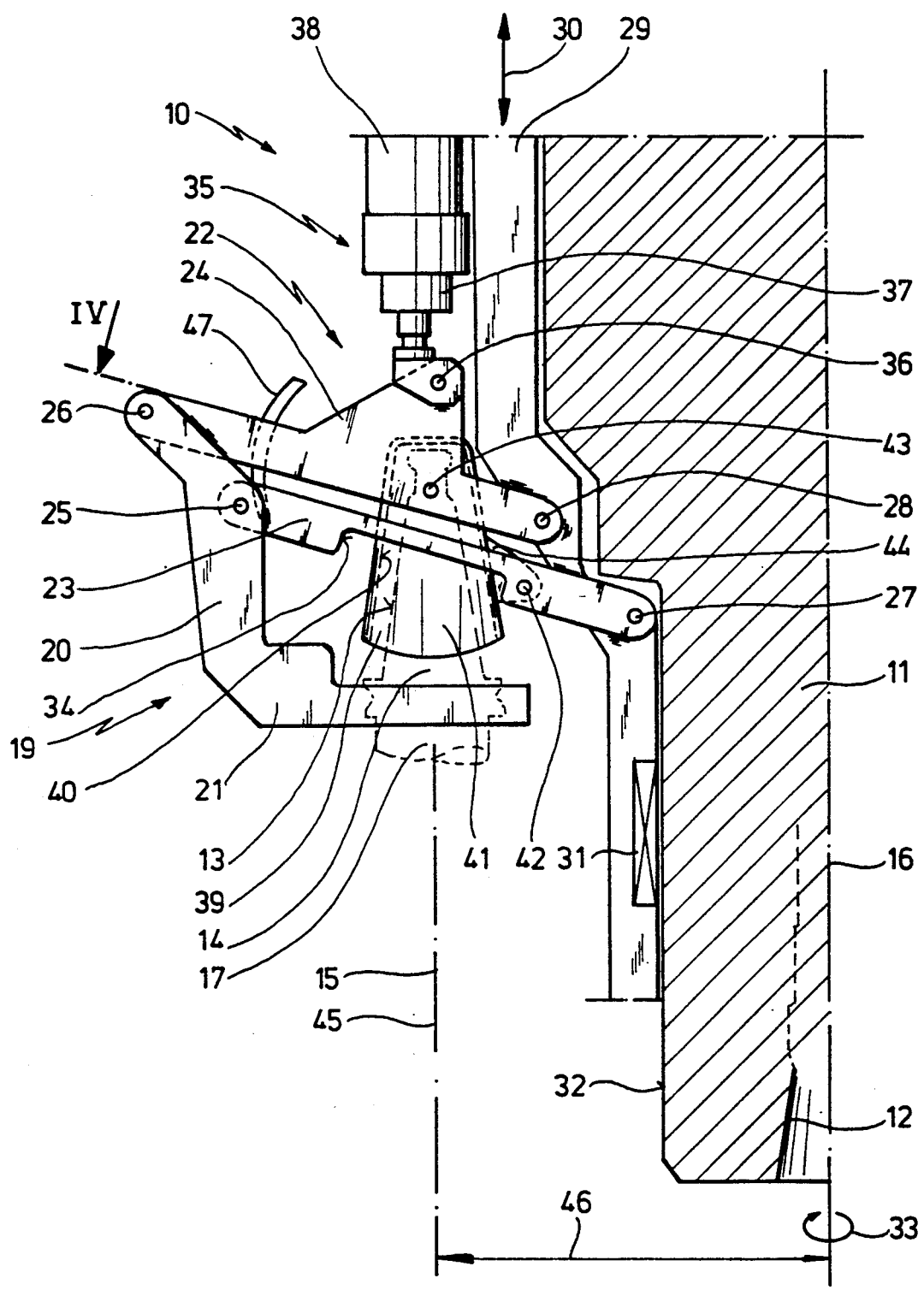
FIG. 1 is a side view, partially sectioned, through a tool changing device of a machine tool according to the present invention, with a tool holder located in the magazine position.

In FIG. 1, 10 designates a machine tool according to the present invention, the headstock of which has a rotating spindle 11 in which a receptacle 12 is present.

The receptacle 12 of the spindle 11 is designed so that its configuration is complementary to a cone 13 of a standardized tool holder 14. In the machine tool 10, the tool holders 14 are held with their axes 15 parallel to a spindle axis 16. The tool holders 14 are provided, beneath the cone 13, with an annular flange 17, below which is attached a tool (not depicted in the Figure), for example a milling cutter.

In the machine tool 10, multiple tool holders 14 are arranged around the spindle 11 and can each be individually engaged from the magazine position of the tool holder 14 depicted in FIG. 1 into a working position in the receptacle 12 of the spindle 11.

To insert tool holders 14 into the spindle 11 and subsequently remove them, a tool changer 19 is provided, consisting essentially of a gripper arm 20 actuated by an outside force. The gripper arm 20 transitions at its lower end into a gripper 21, which grasps the tool holder 14 in the region of the annular flange 17. The gripper 21 is preferably designed so that the tool holder 14 is rotatably held therein, so that the gripper 21 can remain on the tool holder 14 even when the latter is in the working position, thus reducing tool changing times.

To maintain the alignment of the tool holder 14 with the vertical axis at each phase of the tool changing procedure, the gripper 21 is part of a parallelogram mechanism 22. The parallelogram mechanism 22 has a first rod 23 and a second rod 24 parallel thereto. The rods or beams 24 are mounted on the gripper 21 by means of a first pivot 25 and a second pivot 26, and at their respective opposite ends in a third pivot 27 and a fourth pivot 28. The pivots 25 to 28 extend perpendicular to the plane of the drawing in FIG. 1.

The third pivot 27 and fourth pivot 28 are located on a quill 29 which surrounds the spindle 11. The quill 29 is displaceable, in a known manner, relative to the spindle 11 and parallel to the spindle axis 16, as indicated by an arrow 30.

Since the spindle 11 rotates relative to the quill 29, there is provided in the lower region of the quill 29 a bearing 31 which runs on a cylindrical surface 32 of the spindle. The direction of rotation of the spindle 11 is indicated by an arrow 33.

The first beam 23 has a recess 34 associated with the bearing 31, the significance of which will be explained later. A piston-cylinder unit 35, which is articulated by means of a fifth pivot 36 to an upward projection of the top second beam 24, is provided in order to actuate the tool changer 19. The fifth pivot 36 extends parallel to the pivots 25 through 28. The piston-cylinder unit 35 consists essentially of a piston 37 that engages in an articulated manner with the fifth pivot 36, and a cylinder 38 which is mounted pivotedly at its upper end (not depicted in FIG. 1) on a radial projection of the quill 29.

FIG. 1 shows the tool holder 14 in the magazine position, in which the piston 37 is completely retracted into the cylinder 38. The quill 29 is also at its upper end position relative to the spindle 11.

In the magazine position, the beams 23, 24 are located in a slightly upward alignment, so that the pivots 25, 26 lie somewhat higher up than the pivots 27, 28. In this position, the cone 13 of the tool holder 14 is inserted through an opening 39, which is open at the bottom, into a cavity 40 which is formed in a sheath 41. The sheath 41 is mounted by means of a sixth pivot 42 to the first beam 23 and by means of a seventh pivot 43 to the second beam 24, so that it also moves when the parallelogram 22 swings. The sixth pivot 42 is spaced laterally away from the seventh pivot 43, by means of a plate 44 provided on the sheath 41, so that an imaginary connecting line between the pivots 42 and 43 runs parallel to imaginary connecting lines between the pivots 25 and 26, and 27 and 28, respectively.

In this manner the longitudinal axis of the sheath 41, indicated at 45, is kept parallel to the spindle axis 16 while the gripper arm 20 swings. In the magazine position depicted in FIG. 1, the longitudinal axis 15 of the tool holder 14 and the longitudinal axis 45 of the sheath 41 coincide, and are spaced away from the spindle axis 16 by a radial distance indicated at 46.

To cap the sheath 41, a cover 47 in the form of a segment of a hollow cylinder is provided on the second beam 24. The cone 13 of the tool holder 14 is completely covered by the sheath 41, and is thus protected against the metal chips and drilling fluid that fly around when a workpiece is being machined in the working area of the machine tool 10.

Figure 2:
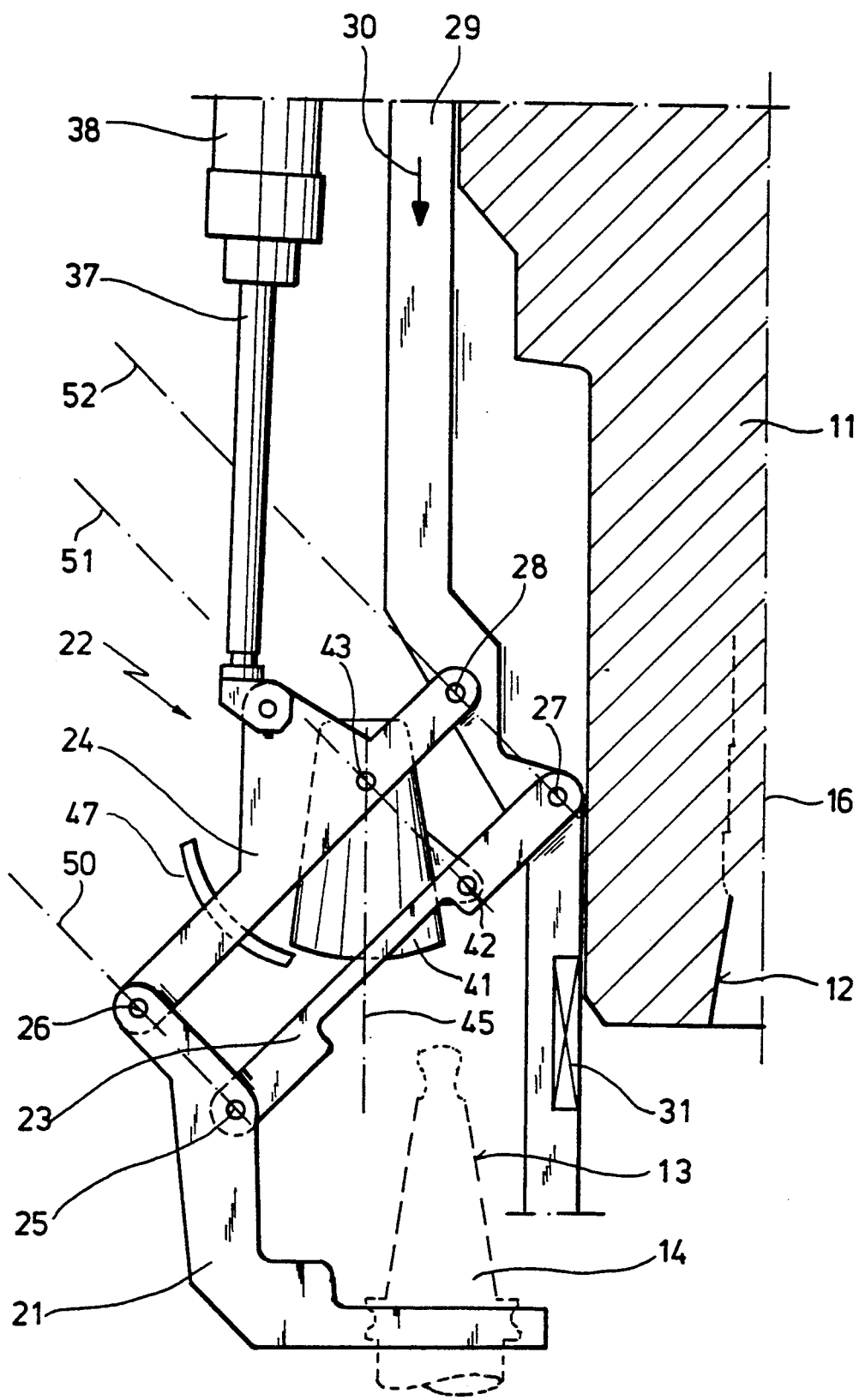
FIG. 2 is a depiction similar to FIG. 1, but with the tool holder in an intermediate position.

FIG. 2 shows an intermediate position in which the piston 37 has been partly extended downward out of the cylinder 38. At the same time, the quill 29 has been moved downward in the direction of the arrow 30. Consequently, the beams 23, 24 occupy a position inclined obliquely downward and to the left. Because of the downward movement of the quill 29, the cone 13 of the tool holder 14 is now located below the lower edge of the spindle 11.

In FIG. 2, numbers 50, 51 and 52 indicate imaginary connecting lines between the pivots 25 and 26, 42 and 43, and 27 and 28 respectively, with connecting lines 50 and 52 corresponding to the sides of the parallelogram. It is evident that the connecting lines 50, 51, 52 run essentially parallel to one another, so that the parallelogram mechanism 22 cannot jam. In the practical example shown, the sheath 41 is made of plastic, so that a slight deviation in the parallelism between connecting line 51 and connecting lines 50 and 52 does not cause the parallelogram mechanism 22 to jam, since the plastic material of the sheath 41 deflects in response to distortion between pivots 42 and 43. As FIG. 3 shows, the arrangement is designed so that as the piston 37 extends further, the beams 23 and 24 are swung even further downward until they reach a vertical end position in which the tool holder 14 is aligned with the spindle axis 16.

Figure 3:
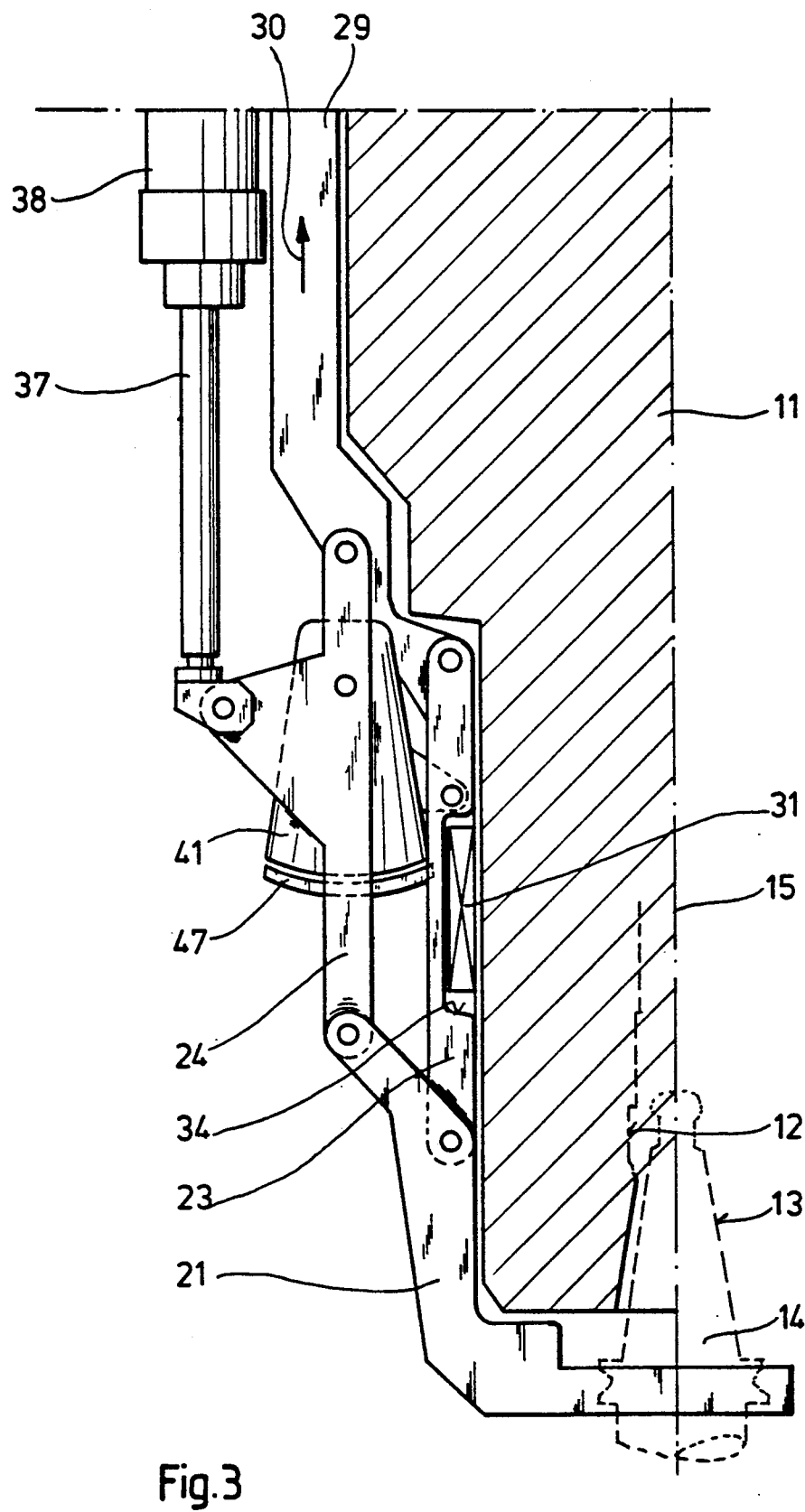
FIG. 3 is a further depiction similar to FIG. 1, but with a tool holder in the working position.

It is also evident from FIG. 3 that the bearing 31 fits precisely into the recess 34 of the first beam 23 when the latter is aligned, in the working position of the associated tool holder 14, approximately parallel to the spindle axis 16.

If, with the parallelogram mechanism 22 in this position, the quill 29 is again displaced upward in the direction of the arrow 30, the cone 13 of the tool holder 14 enters the receptacle 12 of the spindle 11, so that the tool holder 14 can be locked there with the usual collet chucks or the like.

In this working position of the tool holder 14, the cover 47 completely covers the opening 39 of the sheath 41, so that flying chips cannot get into the sheath 41 of the tool holder 14 that is located in the working position.

Figure 4:
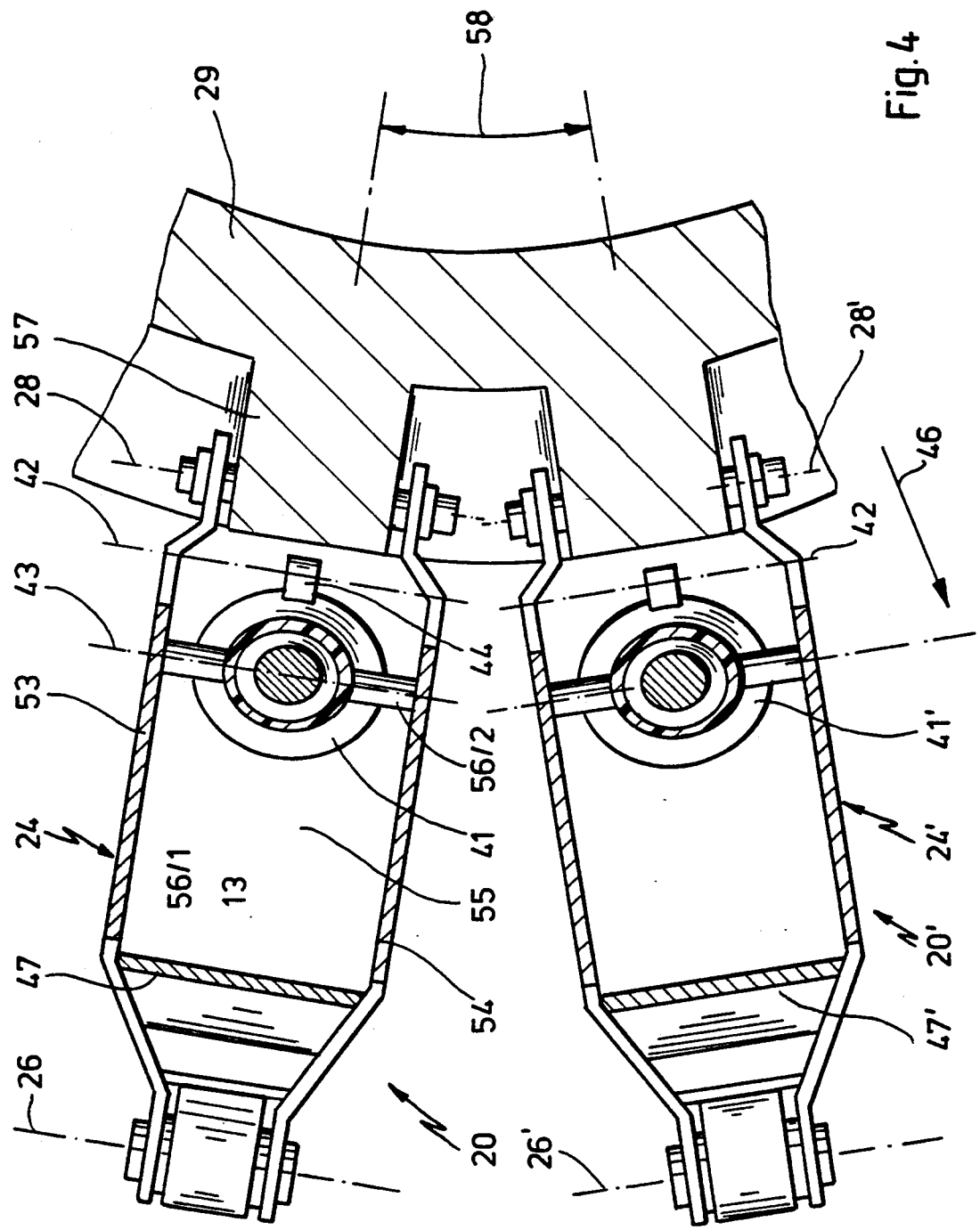
FIG. 4 is a view of a portion of the machine tool from FIG. 1, in the direction of arrow IV in FIG. 1, in section.

FIG. 4 depicts the quill 29 along with two gripper arms 20 and 20', partially and in section, in a view along the arrow IV in FIG. 1. For reasons of clarity, only the upper second beam 24 and 24' of each of the identical gripper arms 20 and 20' respectively is depicted. The second beam 24 has two side pieces 53 and 54, arranged as mirror images of each other, which are joined at their ends in the pivots 26 and 28. The cover 47 extends between the side pieces 53 and 54 and braces them. As FIG. 4 shows, the two side pieces 53 and 54 define between them an open space 55 in which the tool sheath 40 is arranged. The cone 13 is also evident in the sectioned depiction.

The sheath 41 is snapped into the side pieces 53 and 54 from the inside by means of two lateral pins. Thus the tool sheath 41 can easily be removed from the second arm 24 for service purposes. The lateral pins 56, which can either form a single unit with the sheath 41 or be part of a sheet-metal hood which sits on the sheath 41, constitute the pivot 43 of the sheath 41. In the same way, the pivot 42 which passes through the plate 44 indicated in FIG. 4 can be joined, by insertion or in a threaded manner by means of a bolt, to the first beam 23, although this is not evident in FIG. 4.

The sheath 41 is completely contained in the open space 55, so that it does not project laterally beyond the second beam 24 in the direction of the pivots 43 or 42. Thus the width of the gripper arms 20 and 20' is defined by the attachment of the second beam 24 to the pivot 28. The pivot 28 is inserted, in a manner known in the art, in a radial projection 57 of the quill 29.

The radial distance 46 between the sheath 41 (and thus the gripper 21 located in the magazine position) and the spindle axis 16 is sufficiently large that a total of twenty gripper arms 20 can be arranged, uniformly distributed, around the periphery of the quill 29. Each two adjacent gripper arms 20, 20' include between them an angle, indicated at 58, which in the practical example selected here is 18°. Although in the machine tool according to the present invention the quill 29 has a smaller outside diameter than in the machine tool according to the prior art (because the radial projection to accommodate the cavities is no longer necessary), nevertheless because the sheaths 41 are arranged outside the quill 29, considerably more gripper arms 20 are arranged around the periphery of the quill 29.

We claim:
1. Machine tool, comprising:
   a spindle means, said spindle means rotating about a spindle axis;
   a quill means, said quill means being displaceable relative to said spindle axis;
   a plurality of gripper arm means arranged at intervals around said spindle means and fastened to said quill means;
   a plurality of tool holder means each comprising a cone arrangement, each of said tool holder means having a longitudinal axis and being carried by a respective gripper arm means;
   a pivotable swinging support for supporting said gripper arm means and for individually displacing said gripper arm means between a magazine position located at a distance from said spindle means and a working position provided in said spindle means, the remaining ones of said tool holder means being retained in said magazine position; and
   a plurality of separate sheath means open at the bottom and forming a cover at least for a respective cone arrangement, each one of said sheath means having a longitudinal axis and being provided for a respective tool holder means, and being located at said respective gripper arm means, in said magazine position each of said tool holder means being inserted into said respective sheath means;

wherein said longitudinal axis of said tool holder means and said longitudinal axis of said sheath means are essentially always aligned parallel to said spindle axis; and wherein said gripper arm means are part of a parallelogram mechanism arrangement having two rod means parallel to one another, whereby said respective sheath means is mounted by means of a first pivot means on said first rod means and by means of a second pivot means on said second rod means, an imaginary connecting line being aligned between said two pivot means, essentially parallel to sides of said parallelogram mechanism arrangement, said sides being different from said rod means.

2. Machine tool according to claim 1, wherein said sheath means is made of plastic and is fastened to said respective gripper arms by its respective pivot means, said pivot means being pluggable.

3. Machine tool according to claim 1, wherein a cover means is provided on each of said gripper arm means for automatically capping said respective sheath means when said respective tool holder means is in said working position.

* * * * *